United States Patent [19]
Cink et al.

[11] Patent Number: 6,016,514
[45] Date of Patent: *Jan. 18, 2000

[54] METHOD AND APPARATUS FOR AN IMPROVED SPECIALIZATION OF A CORBASERVICES GENERICFACTORY

[75] Inventors: Kimberly Ann Cink, Rochester, Minn.; Russell Ley Newcombe, Round Rock, Tex.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/741,730

[22] Filed: Oct. 31, 1996

[51] Int. Cl.[7] ........................................................ G06F 9/46
[52] U.S. Cl. .............................................................. 709/300
[58] Field of Search .................................... 709/303, 300, 709/301, 302, 304, 305; 395/702

[56] References Cited

PUBLICATIONS

*COBRAservices: Common Object Services Specification,* Revised Edition.
*COBRAservices: Common Object Services Specification,* Revised Edition: Mar. 31, 1995.
Life Cycle Services Specification, OMG TC Document 93.7.4, pp. 1–21, Jul. 1993.

*Primary Examiner*—Alvin E. Oberley
*Assistant Examiner*—Gary Scott Fourson
*Attorney, Agent, or Firm*—David A. Mims, Jr.

[57] ABSTRACT

A method and apparatus for implementing generic factories which are used to create objects in a distributed object-oriented programming environment. This method and apparatus are applicable to the Object Management Group (OMG) CORBAservices GenericFactory interface. A create_object method implementation is subdivided into its' elemental parts, specifically finding an appropriate factory, interacting with that factory to create the object, and initializing an object. New operations are introduced which support each of these elemental parts. This allows implementations of GenericFactories to have a higher degree of reuse then when the standard interfaces are used as is.

9 Claims, 10 Drawing Sheets

METHOD AND APPARATUS FOR AN IMPROVED SPECIALIZATION OF A CORBASERVICES GENERICFACTORY

CROSS REFERENCE TO RELATED APPLICATIONS

This application is related in subject matter to the following applications filed concurrently herewith and assigned to a common assignee:

Application Ser. No. 08/741,729 filed by Kimberly Cink and Russell Newcombe entitled, "Method and Apparatus For Defining the Scope of a CORBAservices Factory-Finder".

Application Ser. No. 08/741,728 now U.S. Pat. No. 5,787,438 filed by Kimberly Cink and Russell Newcombe entitled, "Method and Apparatus For Incorporating Policies In Searches For Factory Objects".

Application Ser. No. 08/616,116 filed by Kimberly Cink and Russell Newcombe entitled, "Method and System For Data Filtering Within An Object-Oriented Data Processing System".

The foregoing co-pending applications are incorporated herein by reference.

FIELD OF THE INVENTION

The present invention relates to data processing systems, and more particularly, to defining improvements for implementing generic factories which are used to create objects in a distributed object-oriented programming environment.

BACKGROUND OF THE INVENTION

The development of application and system software for data processing systems has traditionally been a time-consuming and somewhat repetitive task, with software developers often having to write or rewrite code to perform well-known user interface and system functions in addition to writing the code utilized to implement the desired new functionality. Recently, object-oriented programming (OOP) has emerged as a dominant new programming paradigm that enables the rapid development and implementation of functionality while permitting the customization and reuse of objects.

The power of OOP as a software development philosophy is realized chiefly through object frameworks, which provide a collection of base object classes that can be selectively utilized by a system developer to create a software system, much like a hardware developer might construct a desktop computer from standard hardware components. Object frameworks are particularly advantageous when utilized within a distributed computing environment in which multiple, possibly heterogeneous, computer systems are interconnected to allow system hardware and software resources to be shared between computer systems. In order to permit programs written in multiple diverse languages to utilize object classes defined within a single object framework, it is necessary to develop a minimum level of object standardization, thereby enabling, at least to some degree, the interoperability of object-oriented software. One organization that is working to establish industry guidelines and object management specifications to provide a common object framework for application development is the Object Management Group (OMG). The specifications promulgated by OMG enable the reusability, portability, and interoperability of object-based software in heterogeneous distributed computing environments (HDCE). An example of a commercially available object framework that conforms to OMG specifications is the Distributed System Object Model (DSOM), which is described, for example, in the "SOM Objects Toolkit version 3.0 Programmer's Guide, Volume 1: SOM and DSOM", available from International Business Machines Corporation.

The Object Management Group (OMG) defines an industry standard for Life Cycle Services in "CORBAservices: Common Object Services Specification", OMG Document No. 95-3-31. Within the OMG Life Cycle Services standard, a number of object-oriented programming interfaces are defined in support of the creation and destruction of objects within a heterogeneous distributed computing environment (HDCE). Among the interfaces introduced within the OMG Life Cycle Services standard is the GenericFactory interface, which provides a standard service that can be utilized by applications to create an object within the heterogeneous distributed computing environment (HDCE). The OMG GenericFactory interface introduces an operation called create_object, which returns a newly created object. This operation takes as input two parameters, a Key and a Criteria, where the key defines what to create and the Criteria defines additional specifics, such as how to initialize the object. In general, any implementation of the GenericFactory create_object operation would have to perform three unique steps, those being 1) finding an appropriate object specific factory to use to create the object, interacting with the object factory to create the object and 3) interacting with the object to ensure it is properly initialized prior to returning it to the requester.

The OMG specification provides further information that relates to these steps. Relative to finding the appropriate object specific factory to use, the specification indicates that the Key parameter is used to define what to create, such as the interface and/or implementation the created object is to support. Where that object is to be created (the scope within which the object should be created) is defined by the GenericFactory itself. Therefore, the GenericFactory defines "where" and the Key parameter defines "what" to create. Relative to interacting with the object specific factory, the OMG specification gives no guidance, and it is assumed that the GenericFactory implementation knows how to interact with the object specific factory. Relative to initialization of the object, the OMG specification suggests that the Criteria parameter be used to pass in initialization values, but again it is assumed that the GenericFactory knows how to interact with the object to initialize it.

Although the definition and guidance given by the OMG specification for GenericFactory, and in particular the create_object operation, is useful and highly desirable, it does not sufficiently define the interface to allow for reuse of implementation. Any two implementations of create_object that differ only slightly in any one of the three major steps requires an entire reimplementation of the create_object operation. Consequently, it would be desirable to provide an interface capable of enabling a high degree of implementation reuse by dividing the create_object operation into its elemental parts.

SUMMARY OF THE INVENTION

This invention relates to a method and apparatus for improving the OMG GenericFactory interface, enabling a higher degree of implementation reuse in the create_object operation, which is used for creating objects in a distributed object domain. A create_object method implementation is subdivided into its' elemental parts, such as finding the specific factory object to use, interacting with a specific factory object to perform the creation, and performing initialization of an object once it is created. Finding the specific factory object incorporates the use of the OMG CORBAservices FactoryFinder object, which allows the scope of the GenericFactory to be defined through reuse of the FactoryFinder implementation. The steps for creating the object and for initializing the object are moved to new methods. This enhances reuse as subclasses of a GenericFactory implementation now only have to reimplement a specific step rather then the whole create_object operation.

DETAILED DESCRIPTION OF THE EMBODIMENTS

This invention provides a method and apparatus for enhancing the capability to achieve code reuse of an OMG CORBAservices GenericFactory implementation by breaking the create_object operation into its elementary steps. The elementary steps are 1) locating an appropriate object specific factory to use, 2) interacting with that factory to create the object and 3) interacting with the object to initialize it. This invention introduces new operations that allow a GenericFactory to be configured with a FactoryFinder, thus achieving code reuse of the Factory-Finder implementation in defining the scope of the GenericFactory. As used in this invention, scope refers to the range of location of an operation, limiting the location of objects which are to be considered in or created by the operation. This invention also introduces new operations in the GenericFactory interface that allow interaction with a specific factory and initialization of a new object during create_object method processing. This enhances the ability of a GenericFactory subclass to only reimplement that part of the create_object operation that it requires to be unique by making each of these steps independent of the create_object implementation. The invention will now be described in further detail using FIGS. 1–14.

Figure 1:
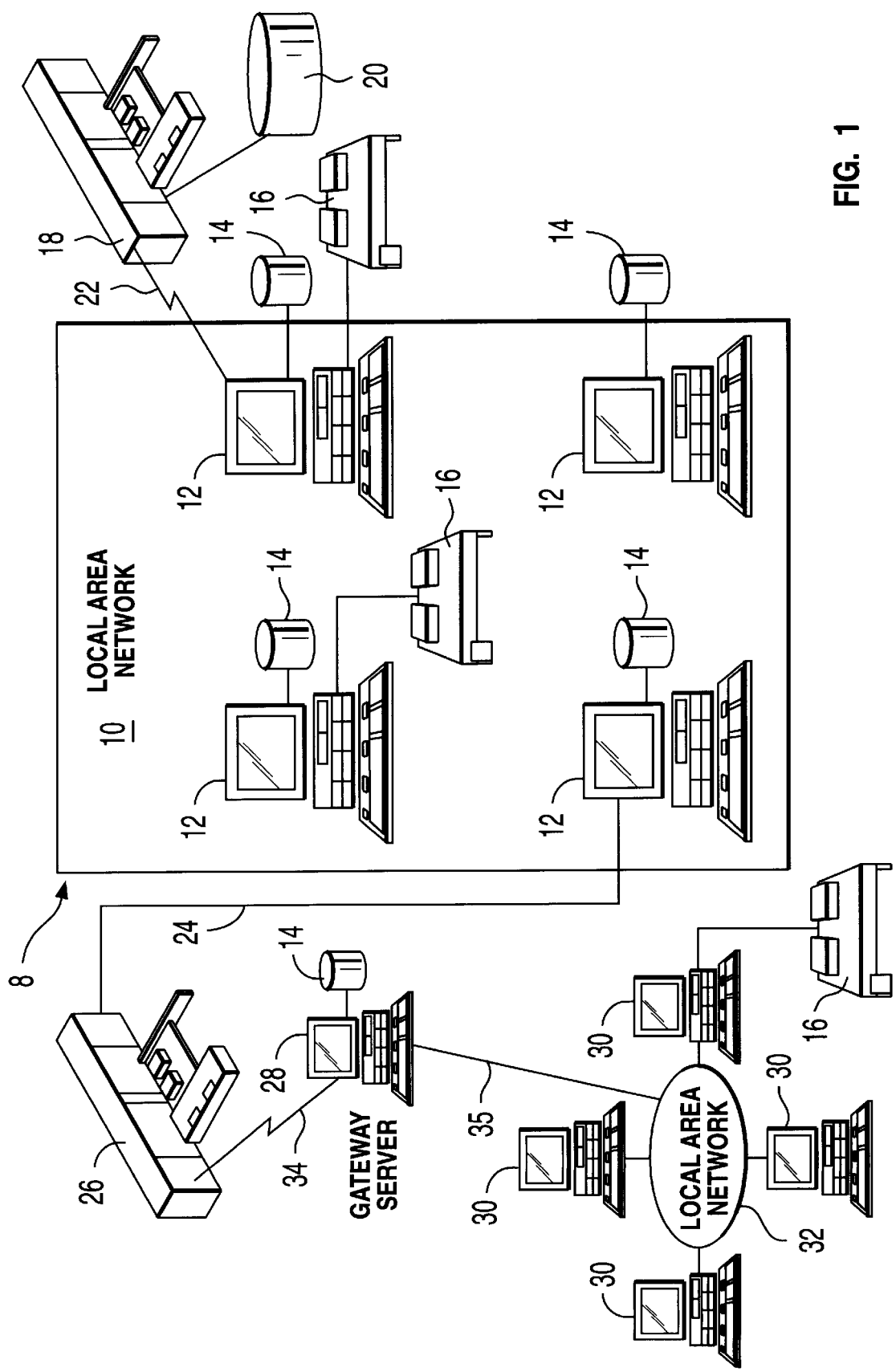
FIG. 1 is an illustrative embodiment of a heterogeneous distributed data processing system in accordance with the present invention.

A representative hardware environment where this invention may be practiced is depicted in FIG. 1, which illustrates a pictorial representation of a distributed data processing system 8. As illustrated, data processing system 8 contains a plurality of networks, including local area networks (LAN) 10 and 32, each of which preferably includes a plurality of individual computers 12 and 30, respectively. One skilled in the art will appreciate that a plurality of workstations coupled to a host processor may be utilized for each such network. As is common in such data processing systems, each computer 12 and 30, may be coupled to a storage device 14, and a printer 16.

Data processing system 8 further includes one or more mainframe computers, such as mainframe computer 18, which may be preferably coupled to LAN 10 by means of a communication link 22. Mainframe computer 18 is preferably coupled to a storage device 20, which serves as remote storage for LAN 10. LAN 10 is also coupled via communications link 24 through communications controller 26 and communications link 34 to gateway server 28. Gateway server 28 is preferably a workstation which serves to link LAN 32 to LAN 10 via communications link 35. As understood by one skilled in the art, data processing system 8 additionally includes unillustrated gateways, routers, bridges, and various other network hardware utilized to interconnect the segments of data processing system 8.

Figure 2:
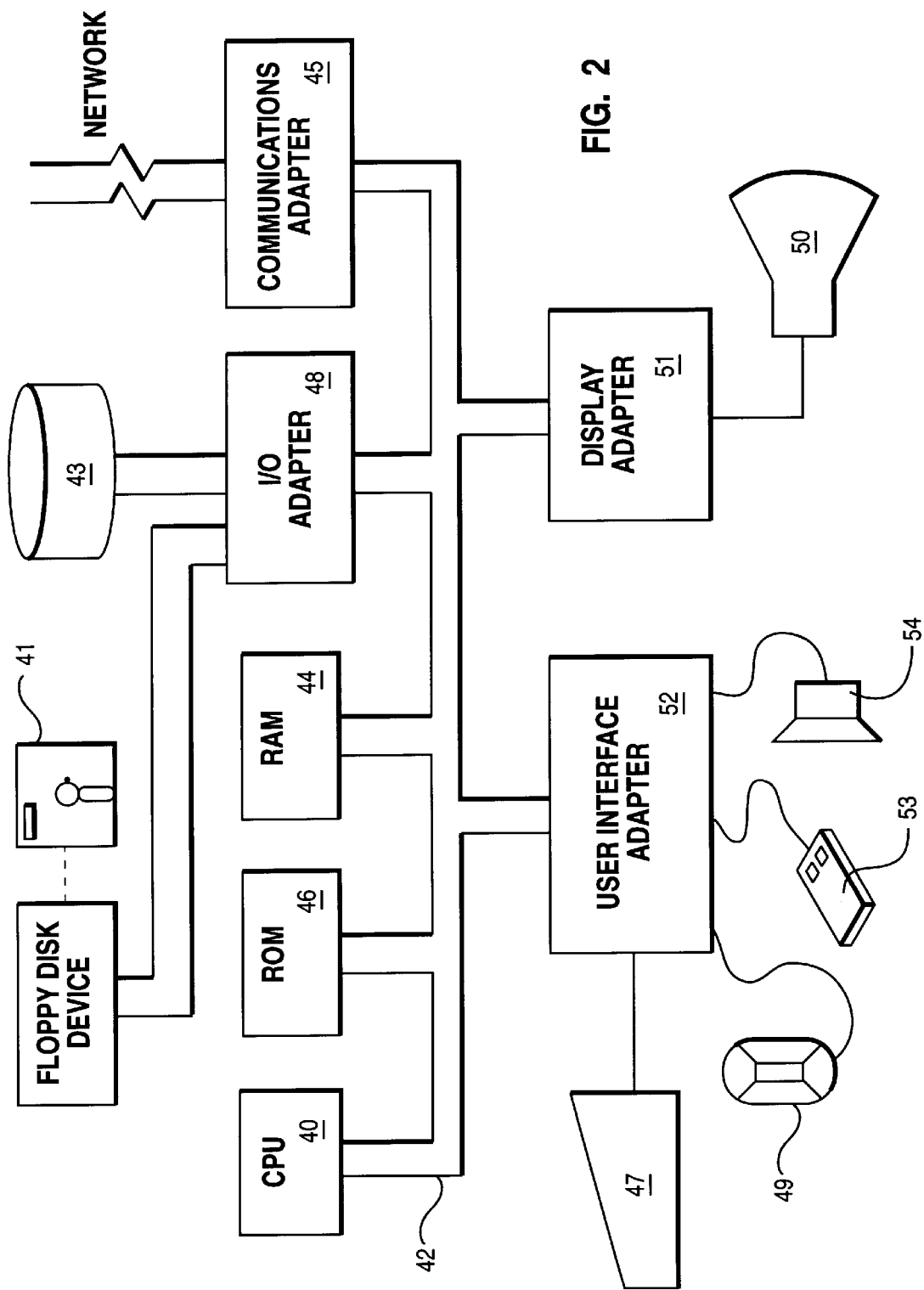
FIG. 2 is a block diagram of a computer/workstation within the distributed data processing system in FIG. 1.

Referring now to FIG. 2, there is shown a pictorial representation of a workstation, having a central processing unit 40, such as a conventional microprocessor, and a number of other units interconnected via a system bus 42. The workstation shown in FIG. 2, includes a Random Access Memory (RAM) 44, Read Only Memory (ROM) 46, an I/O adapter 48 for connecting peripheral devices such as disk unit 43 to the bus, a user interface adapter 52 for connecting a keyboard 47, a mouse 53, a speaker 54, a microphone 49, and/or other user interface devices such as a touch screen device (not shown) to the bus, a communication adapter 45, for connecting the workstation to a data processing network and a display adapter 51, for connecting the bus to a display device 50. The workstation, in the preferred embodiment, has resident thereon the OS/2 operating system and the computer software making up this invention which is included as a toolkit. One skilled in the art will appreciate that the procedures of this invention may be in the form of a computer program product on a computer readable medium, which may be temporarily or permanently loaded on the workstation in disk storage 43, floppy diskette 41, or RAM 44.

Figure 3:
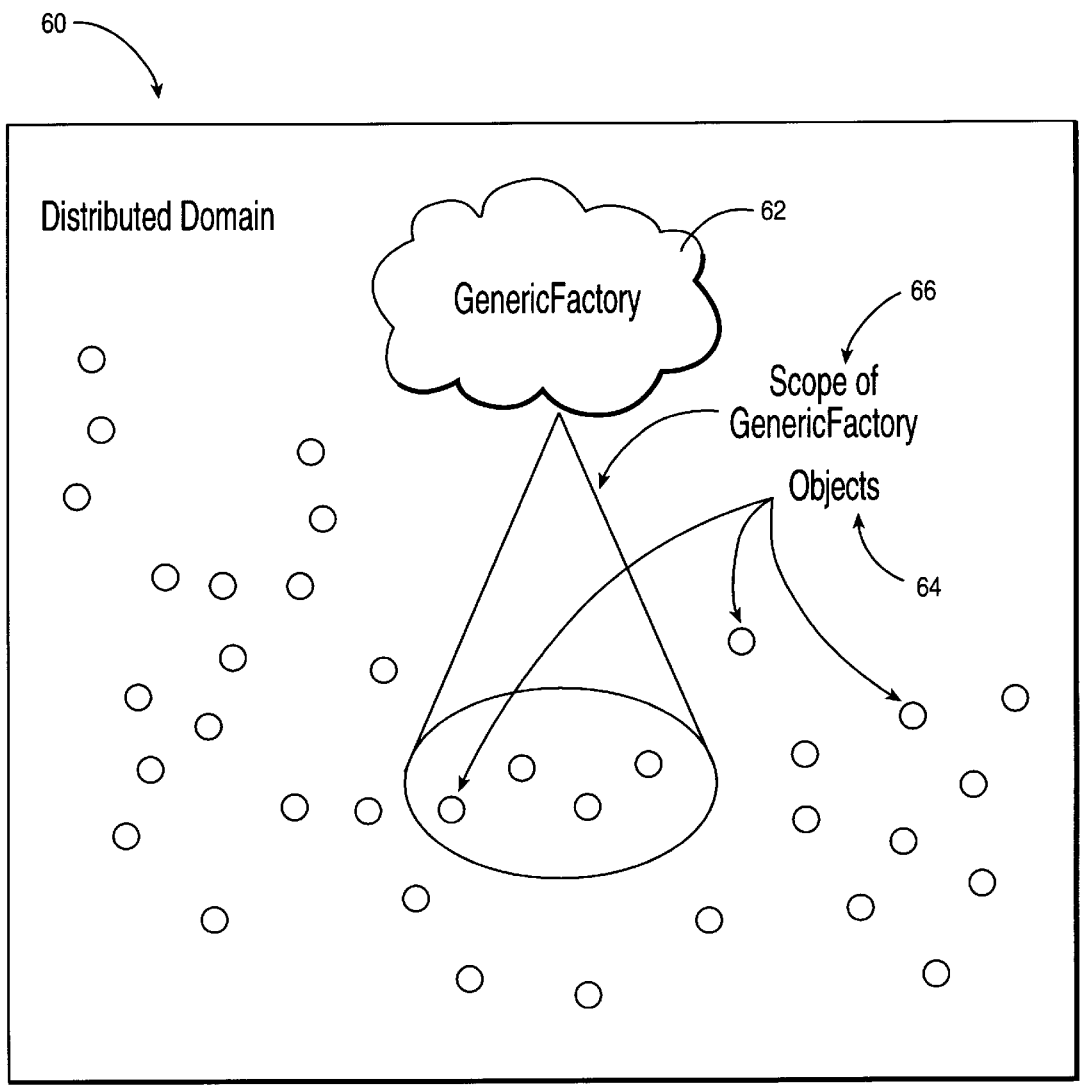
FIG. 3 illustrates a GenericFactory's scope in a Distributed Domain in the prior art.

With reference now to FIG. 3, there is illustrated a GenericFactory's scope in the prior art as defined by the OMG Life Cycle Service. Objects 64 exist in a distributed domain 60 as well as a GenericFactory object 62. The GenericFactory object 62 is capable of creating objects only within a particular scope 66 of the distributed domain 60.

The OMG provides no guidance on how the scope 66 of the GenericFactory 62 is defined. Instead, the scope 66 of the GenericFactory must be determined by the implementation of the GenericFactory 62. One skilled in the art will appreciate that the GenericFactory 62 may have to interact with a type specific factory to create an object 64 of a particular type (e.g., make a call on an A-Factory in order to create an A-object). Consequently, the GenericFactory 62 must also determine how to find a type specific factory with the same scope.

Figure 4:
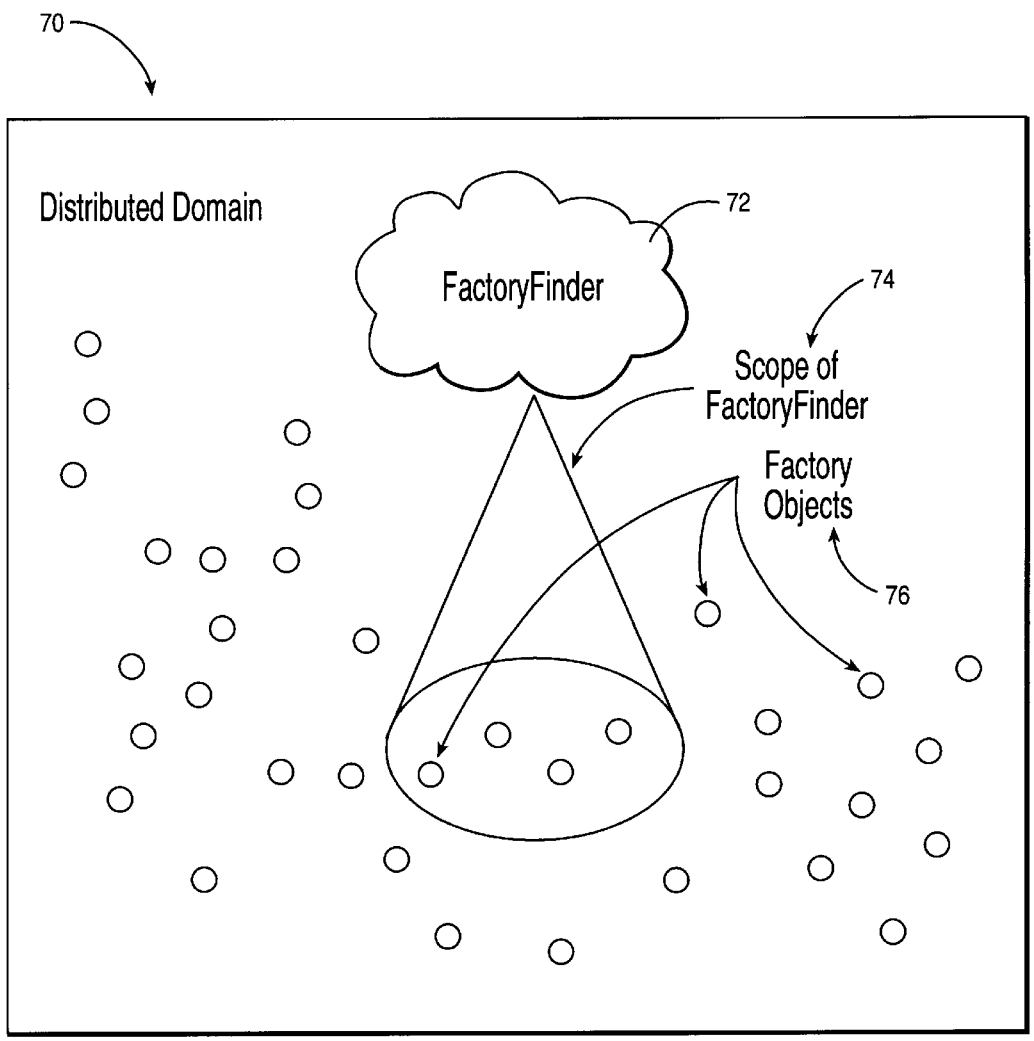
FIG. 4 illustrates a FactoryFinder's scope in a Distributed Domain in the prior art.

Referring now to FIG. 4, there is shown an illustration of a prior art FactoryFinder's scope as defined by the OMG Life Cycle Service. A distributed domain 70 contains factory objects 76 which are used for creating objects (not shown) within the domain. The distributed domain 70 also contains a FactoryFinder object 72 which is capable of finding factories within a particular scope 74 of the distributed domain 70. The OMG provides no guidance on defining the scope 74 for the FactoryFinder object 72.

Figure 5:
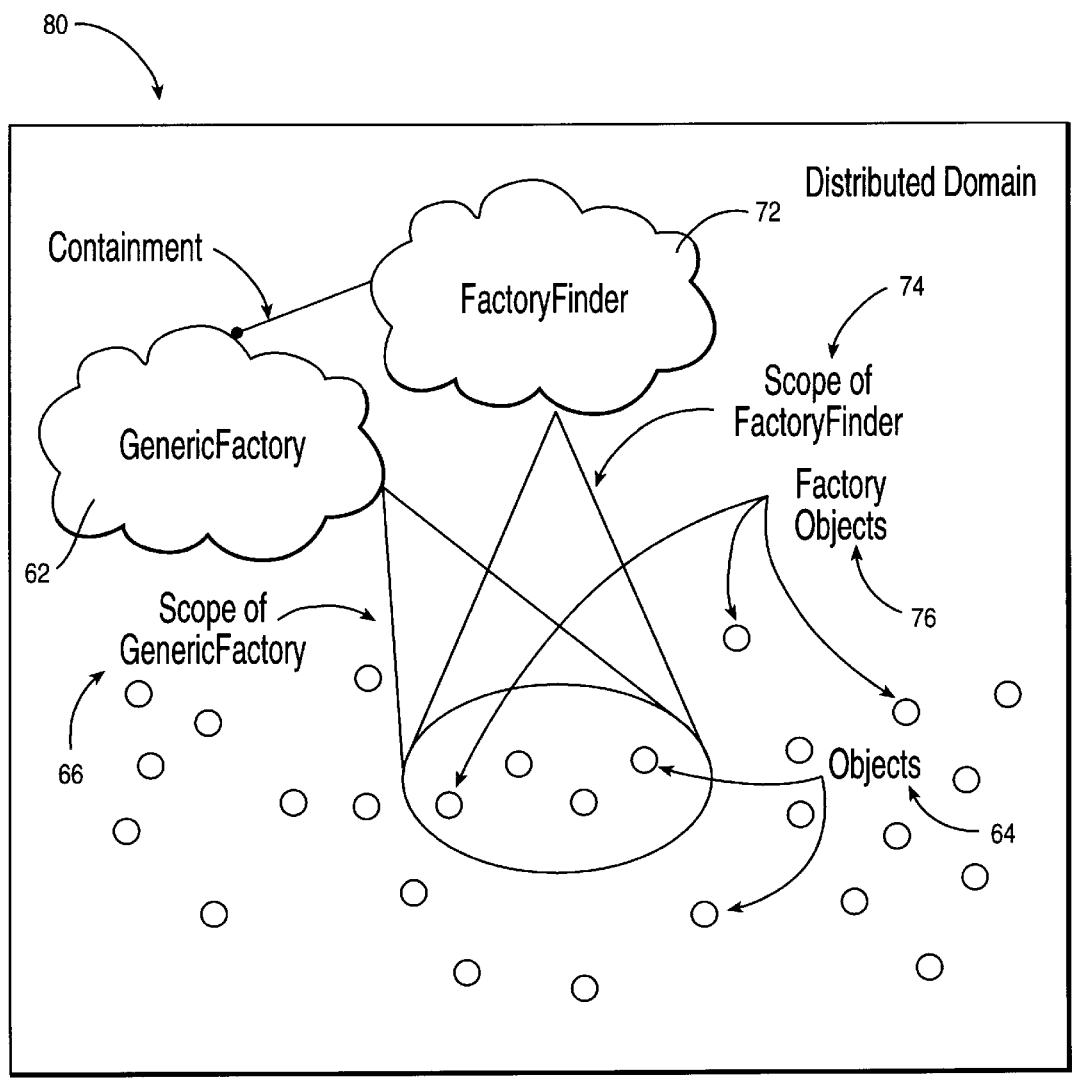
FIG. 5 illustrates a GenericFactory's scope as defined by the scope of a FactoryFinder in a Distributed Domain as disclosed by this invention.

With reference to FIG. 5, there is shown a pictorial of a distributed domain 80 illustrating a GenericFactory object 62 containing a FactoryFinder object 72 as disclosed by this invention. When a GenericFactory contains (i.e., retains a reference to) a FactoryFinder object, the scope 66 of the GenericFactory object 62 is defined using the same scope 74 of domain as the contained FactoryFinder object 72. This technique solves two problems. First, the GenericFactory 62 does not need any mechanism other then containing a FactoryFinder object 72 to define its' scope within the domain. Second, the problem of finding a type specific factory within the distributed domain 80 becomes trivial in that the GenericFactory 62 simply requests the FactoryFinder object 72 to give it one. In order to allow a GenericFactory to contain a FactoryFinder object, the first two new operations of the invention are introduced. Using OMG Interface Definition Language (IDL), these new operations to the GenericFactory interface can be defined as follows:

void set_factory_finder(in FactoryFinder ff);

FactoryFinder get_factory_finder( );

By configuring a GenericFactory with a reference to a FactoryFinder, the first major step of the create_object method (locating an appropriate object specific factory) can be accomplished through reuse of the FactoryFinder implementation. Note that an appropriate object specific factory is able to create the new object such that it supports the interface requested by the user of the create_object method in a location within the scope of the GenericFactory.

Figure 6:
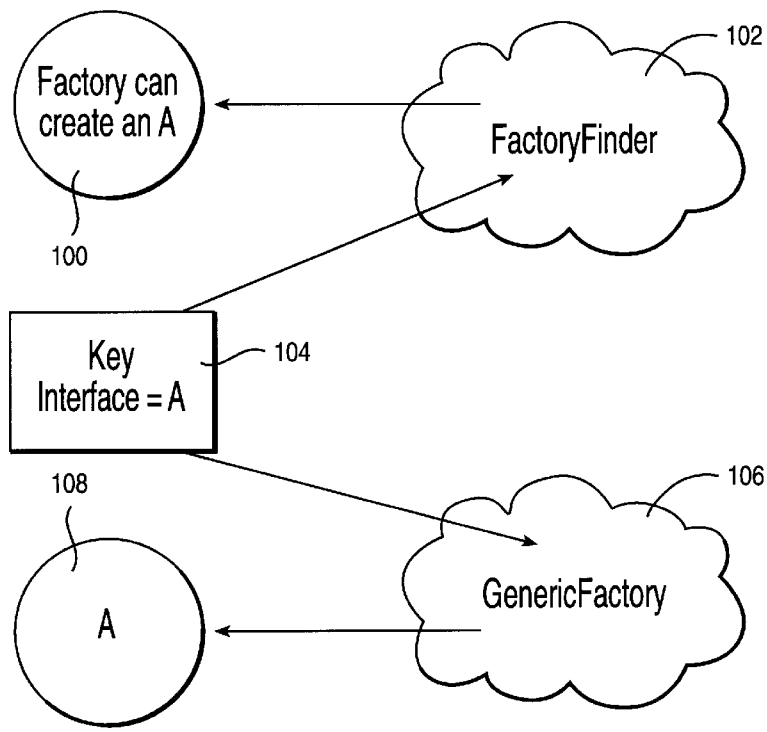
FIG. 6 illustrates a prior art use of a Key with a GenericFactory and FactoryFinder.
Figure 7:
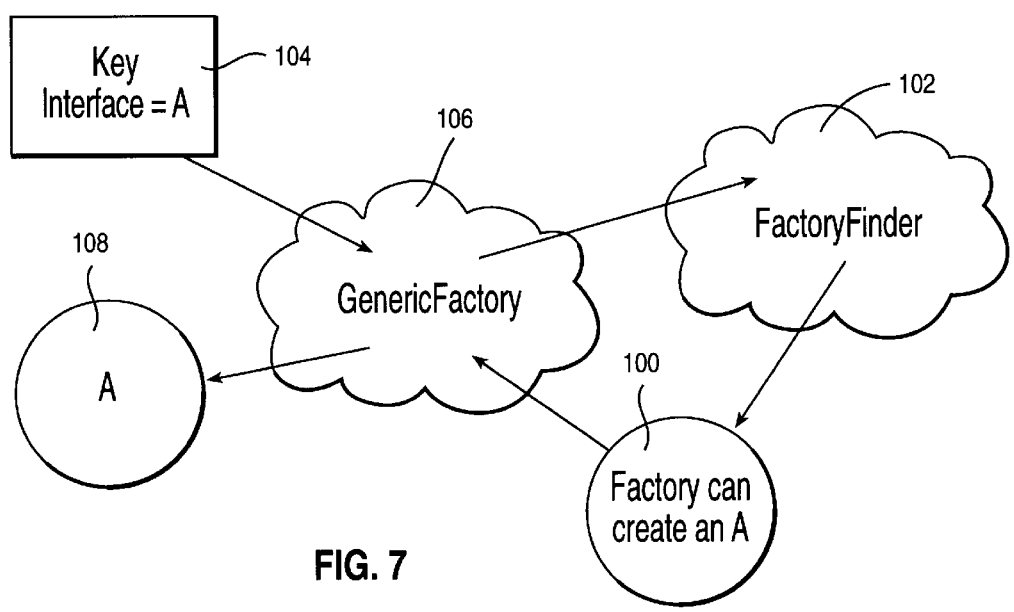
FIG. 7 illustrates the use of a Key with a GenericFactory and FactoryFinder as disclosed by this invention.

This invention describes how the GenericFactory can interact with the contained FactoryFinder object. Turning now to FIG. 6, there is shown a pictorial illustrating the use, in the prior art, of a Key parameter according to the OMG Life Cycle Service Specification. A GenericFactory object 106 and a FactoryFinder object 102 take the same Key parameter 104 to define what is to be returned. In the case of the GenericFactory 106, the Key parameter 104 defines the interface of the object 108 to be created. The Key parameter 104 is used by the FactoryFinder 102 to define the interface of the object that can be created by the factory 100 to be returned. Therefore, when the Key parameter 104 for interface A is passed to a FactoryFinder 102, it returns a Factory 100 which can create an object A. When the Key parameter 104 is passed to a GenericFactory 106, it returns a newly created A 108. Referring now to FIG. 7, there is shown the use of the Key parameter 104 as used in this invention. The GenericFactory 106 simply passes the Key parameter 104 on to its contained FactoryFinder 102, to get a factory 100 which it can use to create the requested object 108.

Figure 8:
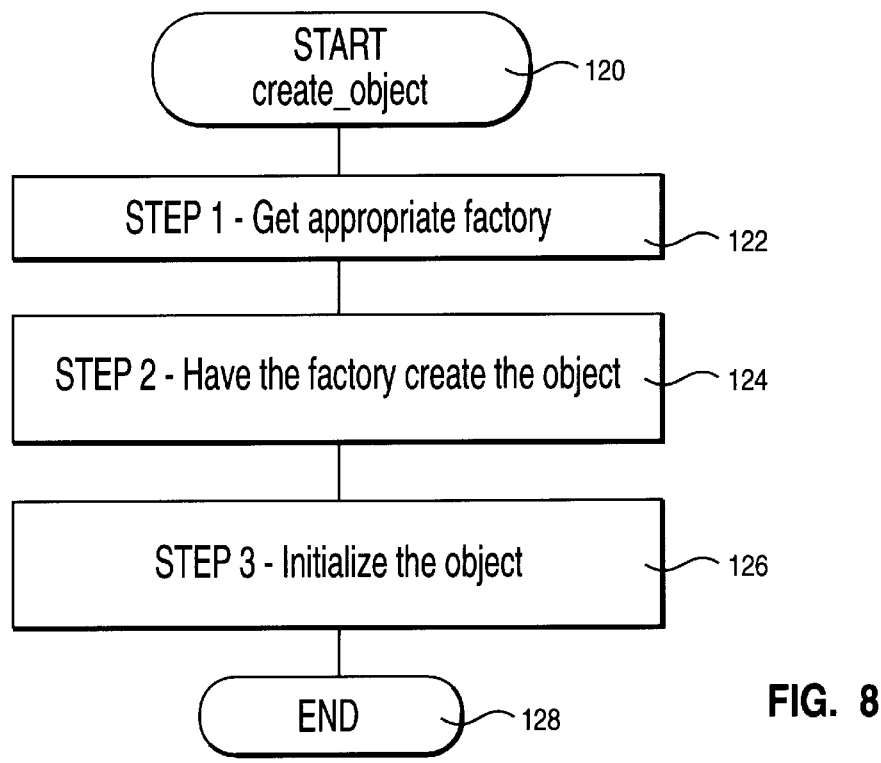
FIG. 8 shows a flow diagram describing the steps normally required in any create_object method of a GenericFactory, and which this invention discloses as the elemental steps of the create_object operation.
Figure 9:
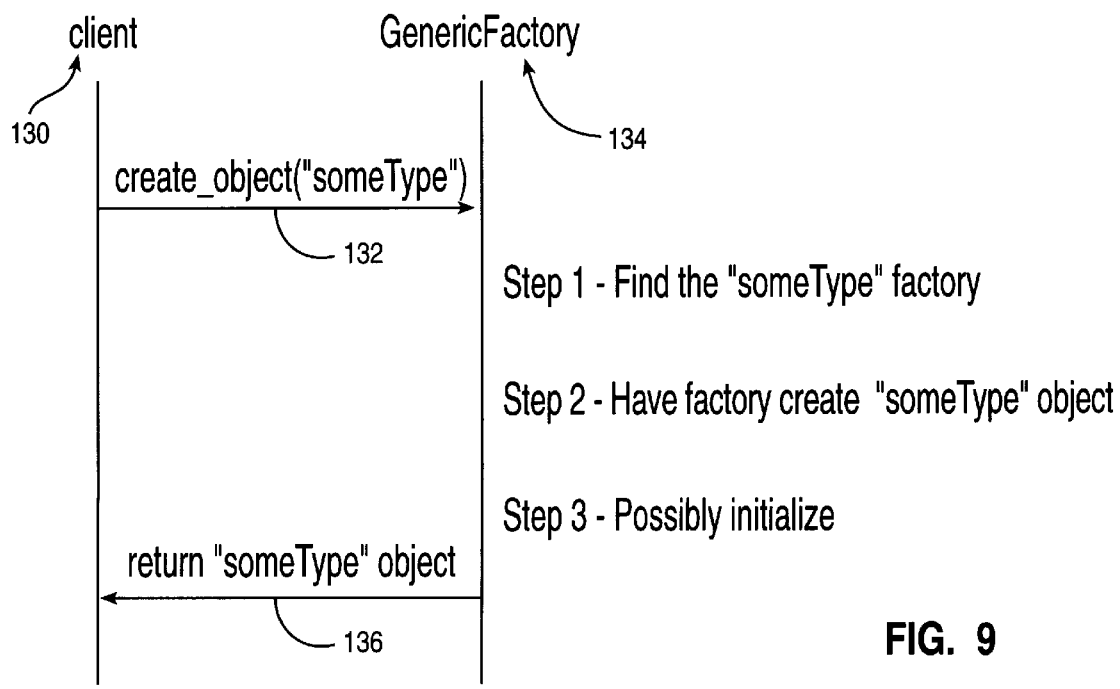
FIG. 9 is an object interaction diagram showing the operation of a create_object method on a GenericFactory object in the prior art.

Referring now to FIG. 8, there is shown a flow diagram for the operation of a GenericFactory's create_object method. The flow diagram shows the three major steps any implementation would have to perform. The procedure starts at block 120 and proceeds to block 122 where the procedure performs the first step of getting an appropriate factory. At block 124, the procedure will have the factory create the object as shown in step two. Step three consists of initializing the newly created object as shown in block 126. After initializing the object, the procedure ends at block 128. With reference to FIG. 9, there is shown an object interaction diagram that shows the prior art operation of a ClientObject 130 making a create_object method call on a GenericFactory object 134. The ClientObject 130 initiates a create_object method 132 call on a GenericFactory object 134. The previously described steps for the operation of a create_object method, as in FIG. 8, are executed by the GenericFactory object 134. One skilled in the art will appreciate that step 3 indicates that the newly created object is "possibly initialized". This is because it is usually impossible for a generic factory implementation to know how to initialize an object. An exception is where a particular object's environment defines a specific protocol for initialization. It will be further appreciated by one skilled in the art that while the interaction diagram shows a create_object method, such that all three steps appear within a single method, steps 2 and 3 often have to be specialized to interact with a type specific factory (step 2), and/or to correctly initialize the object (step 3). The GenericFactory object 134 returns the requested object 136 to the ClientObject 130.

Figure 10:
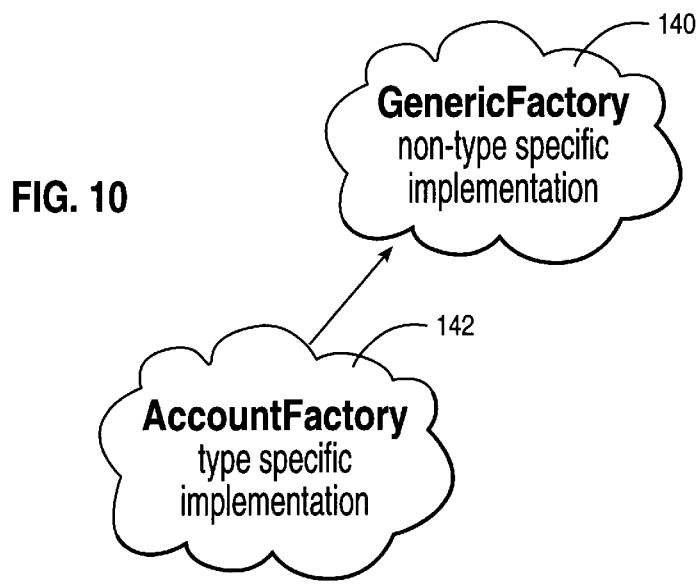
FIG. 10 depicts a class diagram illustrating the class relationship between a GenericFactory and a type specific subclass (e.g., an AccountFactory)

Referring now to FIG. 10, there is illustrated a class diagram showing the class relationship between a GenericFactory class 140 and AccountFactory subclass 142. The AccountFactory class is used as an example of any type specific subclass implementation of a GenericFactory. The GenericFactory 140 class is truly generic and is not specialized for the creation of any specific type of object. It has an implementation of the create_object method similar to what is shown in FIG. 9. For the creation of some objects types, this implementation may be acceptable. However, for the proper creation and initialization of many other object types, this implementation will not be sufficient. Therefore, a type specific factory is introduced (i.e., it creates account objects, so it is an AccountFactory 142). The AccountFactory 142 is a subclass of GenericFactory 140 because we want clients to be able to use the GenericFactory's 140 create_object interface with the AccountFactory 142. One skilled in the art will appreciate that it is required to reimplement all of the create_object method (all three steps) in AccountFactory 142, even though it may only be step 2 and/or step 3, that must be unique from the original GenericFactory 140 implementation.

Figure 11:
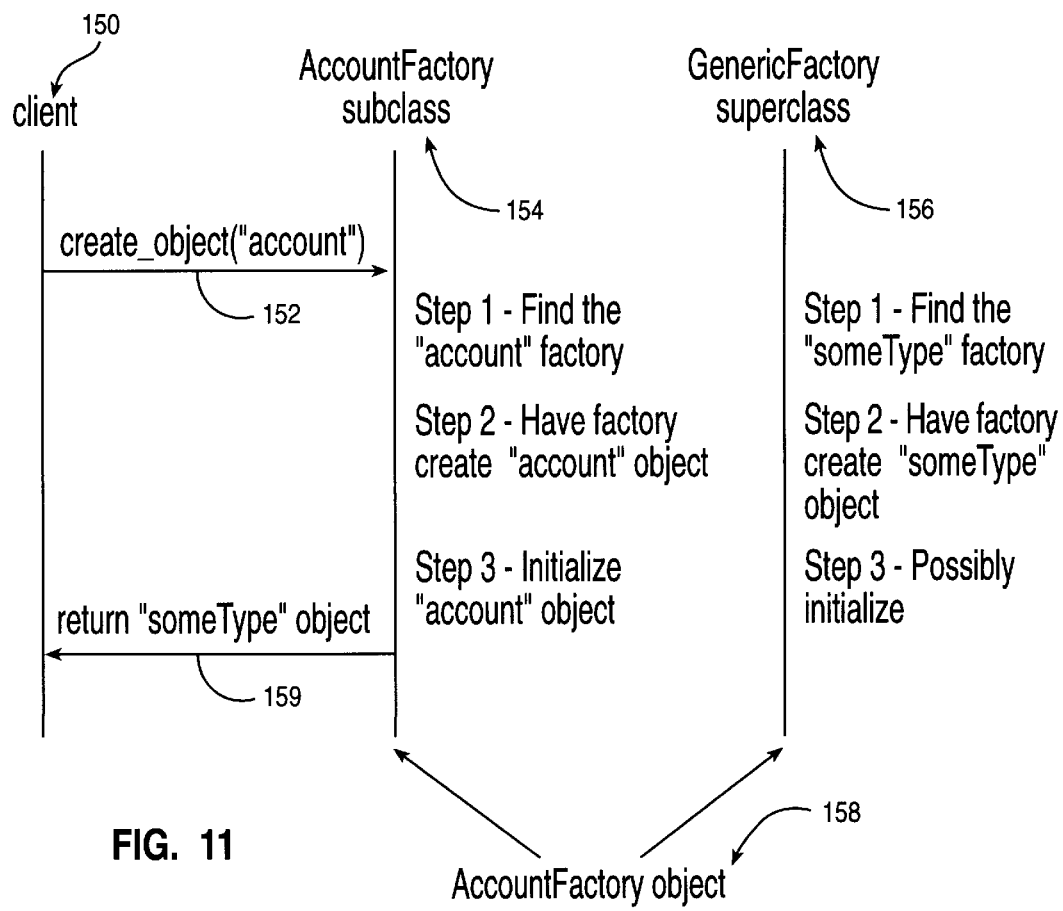
FIG. 11 is an object interaction diagram showing the operation of the create_object method on an AccountFactory object in the prior art.

For example, the interaction needed to locate the actual factory responsible for the creation of the Account object (e.g., a class object) will probably not differ from the implementation in the GenericFactory (i.e., the interaction with the FactoryFinder is the same). Also, the interaction with the factory (e.g., class object) may well not be different from the implementation in the GenericFactory (e.g., the object system may have a common interface to class objects for creating uninitialized objects). However, the actual steps needed to initialize the Account object are likely to be unique to Account objects. However, since all three steps are implemented in the one create_object method of GenericFactory, all three steps need to be reimplemented in the overridden create_object in AccountFactory. This is illustrated in FIG. 11 where there is shown an object interaction diagram showing the operation of the create_object method on an AccountFactory. The AccountFactory subclass 154 and the GenericFactory superclass 156, have been separated out from the AccountFactory object 158, to explicitly show the interaction between these two classes which make up the AccountFactory object 158. A ClientObject 150 makes a create_object 152 call on an AccountFactory object 158. The three steps of the create_object method are performed by the AccountFactory subclass 154, without involvement by the GenericFactory superclass 156. This is because these steps are not uniquely separated but are simply part of the create_object method. The requested object is returned 159 to the ClientObject 150. It should be apparent to those skilled in the art that the AccountFactory class 154 gets no reuse out of the GenericFactory class 156.

Figure 12:
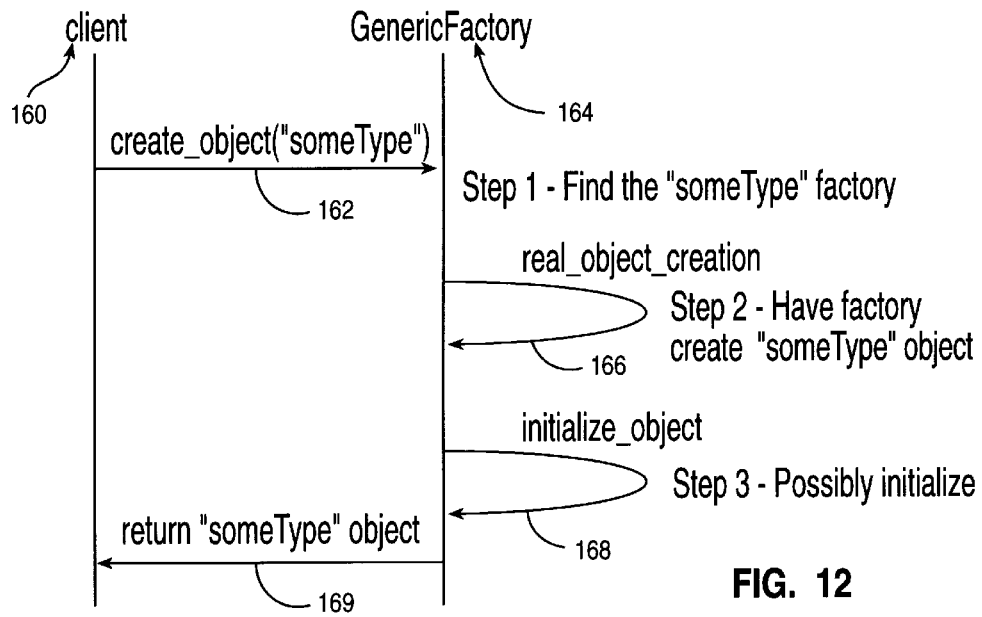
FIG. 12 is an object interaction diagram showing the operation of the improved methods of this invention for a GenericFactory object.

Referring now to FIG. 12, there is shown an interaction diagram illustrating the operation of the improved methods of this invention on a GenericFactory object. A ClientObject 160 initiates a create_object 162 call on a GenericFactory object 164. The GenericFactory object 164 performs the first step of finding the "someType" factory object specified in the create_object 162 call. A real_object_creation 166 method is then performed which causes the factory to create the "someType" object requested by the ClientObject 160. Finally, the initialize_object method 168 is performed on the newly created object. One skilled in the art will appreciate that the returned object 169, has been created by the GenericFactory object 164 by calling other methods on itself (e.g., steps 2 and 3), thus splitting the implementation of create_object into its' logical pieces. The advantage of this will be illustrated in the next figure.

Figure 13:
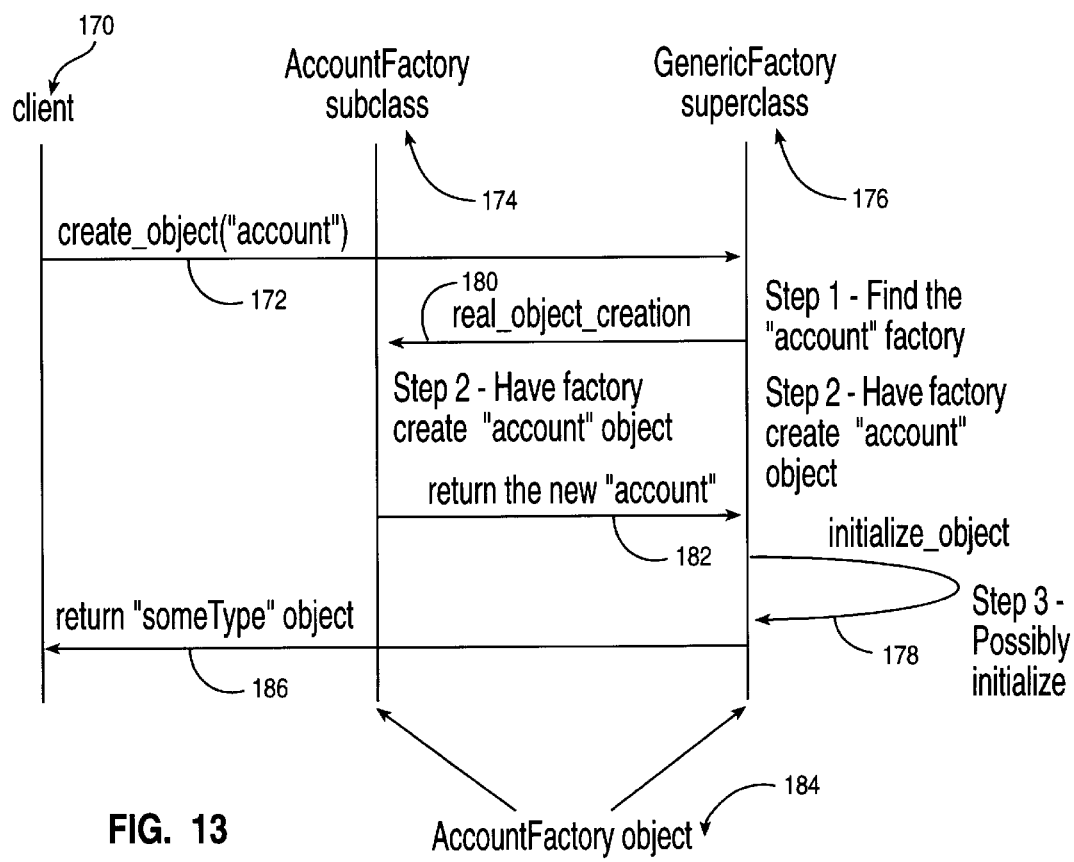
FIG. 13 is an object interaction diagram showing the enhanced reuse of the GenericFactory superclass implementation by the AccountFactory using the improved methods of this invention.

Referring now to FIG. 13, an interaction diagram is shown describing the operation of a create_object method on an AccountFactory object. Similar to FIG. 11, the AccountFactory subclass 174 and GenericFactory superclass 176 of the AccountFactory object 184 are separated to show the interaction between these classes. A ClientObject 170 initiates a create_object("account") 172 call to the AccountFactory object 184, which is handled by the GenericFactory superclass 176. It is handled by the GenericFactory superclass 176 because in this example, the AccountFactory subclass 174 only implements the real_object_creation 180 method. This is the only method implemented by the AccountFactory subclass 174 because this is the only step of the create_object method that AccountFactory object need to be different from the GenericFactory superclass 176 implementation. After the ClientObject invokes the create_object method 172 on the AccountFactory object 184, the request goes directly to the GenericFactory superclass 176 for execution, since the AccountFactory class 174 does not implement the method. The superclass 176 performs step 1 of the method, and then invokes the real_object_creation method 180 on itself. Since the AccountFactory subclass 174 has an implementation, that is where the method is processed. Thus, step 2 is performed by the AccountFactory class 174, and the new object is returned 182 to the GenericFactory class 176. The GenericFactory class 176 then invokes initialize_object method 178 on itself, which is actually processed in the GenericFactory class 176, because the AccountFactory class 174 did not override it. It will be appreciated by those skilled in the art that the AccountFactory subclass 174 only needs to implement the one step that requires different processing, and not all three steps. One skilled in the art will also appreciate that the same scenario can be done with the initialize_object method 178 instead, or in addition to, the real_object_creation method. In fact, it is the initialize_object method 178 where this would most often be needed.

The operations introduced by this invention, whose usage has just been described in FIGS. 12 and 13, might possibly be defined in OMG Interface Definition Language (IDL) as follows:

Object real_object_creation(in CosLifeCycle::Factory factory, in CosLifeCycle::Criteria the_criteria);

void initialize_object(in Object obj, in CosLifeCycle::Criteria the_criteria);

Those skilled in the art and familiar with OMG's Life Cycle Service specification will appreciate that the passing of the the_criteria parameter to these methods allows clients of the GenericFactory to pass additional information relative to the creation and initialization of the object.

Figure 14:
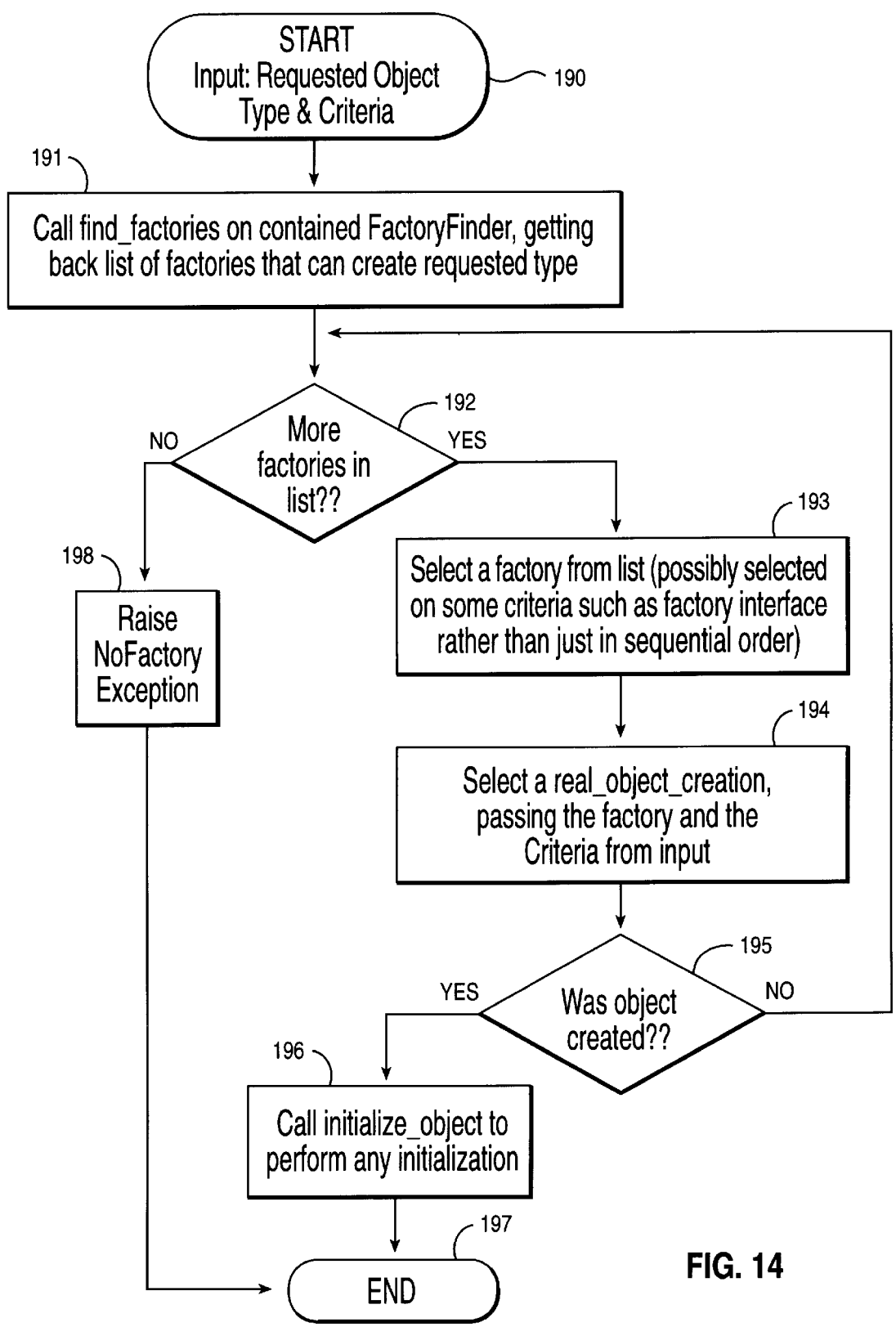
FIG. 14 is a flow diagram showing the logic for a create_object method of this invention.

Referring now to FIG. 14, a flow diagram is shown for the implementation logic for a create_object method. The procedure starts at block 190 where the requested object type and criteria is inputted. At block 191, the procedure calls the find_factories method on a contained FactoryFinder, which returns a list of factories that can create the requested type. A check is performed at block 192 to determine if a desired factory appears on the list. If NO, the procedure raises a No Factory exception, an OMG defined exception, at block 198 and ends at block 197. If YES, processing proceeds to block 193 where a factory is selected from the list. During the selection process, the factories might not be tried in sequential order. Some procedure may be applied to selecting factories of one type prior to selecting factories of another. For example, in some object systems a class object is the lowest form of factory (directly creating the object), and a factory supporting OMGs GenericFactory interface may be a higher form of factory (utilizing other factories under the covers to do the actual creation). The procedure might therefore be to look for class objects first, since they will be the direct creator of the object. If no class objects exist, then look for something that is not a GenericFactory as that is more likely to be a lower level creation mechanism. Lastly, try the GenericFactories. In this last pass, the procedure needs to make sure that the GenericFactory is not the same object as itself, as recursion will just cause an endless loop. One skilled in the art will appreciate that any selection criteria used is dependent upon the object's environment as to what the selection order should be. At block 194, the procedure calls the real_object_creation method, passing the factory and the criteria from the inputted information. A check is performed at block 195 to determine if the object was created. If YES, processing proceeds to block 196 where the initialize_object method is performed to initialize the object, and processing ends at block 197. Returning to block 195, if the object has not been created, processing returns to block 192 for trying various factories until an object is successfully created. The reason for iteratively attempting different factories is as follows. It is assumed that the GenericFactory implementation knows how to create the object if the factory found supports one of a couple of well known creation protocols. However, in the case where the GenericFactory is subclassed, the implementation does not know which creation protocols the subclass may know how to support. By calling real_object_creation with each factory, it lets the subclass determine if it knows how to use that factory. If it does, it creates the object. If it does not, it returns without creating the object and the loop continues until an object is successfully created or there are no more factories.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A method, implemented in a computer system, for defining a scope for a plurality of objects in a distributed domain in an object oriented environment, comprising the steps of:

providing a factory object for creating said plurality of objects in said distributed domain in said object oriented environment;

providing a finder object for retrieving type specific factories capable of creating said plurality of objects within a particular scope in said distributed domain in said object oriented environment; and defining a scope for said factory object by the particular scope of said finder object by containing said finder object in said factory object such that an operation to create an object is executed for said factory object.

2. The method of claim 1, wherein the step of defining a scope of said factory object by the particular scope of said finder object comprises the steps of:

requesting type specific factories by said factory object from said finder object; and searching for said type specific factories capable of creating said plurality of objects in said distributed domain using said type specific finder.

3. The method of claim 1, wherein the step of defining a scope of said factory object by the particular scope of said finder object comprises the steps of:

receiving a request from a client object by said factory object to create an object in said distributed domain;

receiving a Key on said request defining type of object to be created;

passing said Key by said factory object to said finder object having said particular scope; and returning type specific factory by said finder object capable of creating the object of said type defined by said Key within said particular scope.

4. An apparatus for defining a scope for a plurality of objects in a distributed domain in an object oriented environment, comprising:

means for providing a factory object for creating said plurality of objects in said distributed domain in said object oriented environment;

means for providing a finder object for retrieving type specific factories capable of creating said plurality of objects within a particular scope in said distributed domain in said object oriented environment; and means for defining a scope for said factory object by the particular scope of said finder object by containing said finder object in said factory object such that an operation to create an object is executed for said factory object.

5. The apparatus of claim 4, wherein the means for defining a scope of said factory object by the particular scope of said finder object comprises:

means for requesting type specific factories by said factory object from said finder object; and means for searching for type specific factories capable of creating said plurality of objects in said distributed domain using said type specific finder.

6. The apparatus of claim 4, wherein the means for defining a scope of said factory object by the particular scope of said finder object comprises:

means for receiving a request from a client object by said factory object to create an object in said distributed domain;

means for receiving a Key on said request defining type of object to be created;

means for passing said Key by said factory object to said finder object having said particular scope; and means for returning type specific factory by said finder object capable of creating the object of said type defined by said Key within said particular scope.

7. A computer program product having a computer readable medium having computer program logic recorded thereon for defining a scope for a plurality of objects in a distributed domain in an object oriented environment, comprising:

computer readable means for providing a factory object for creating said plurality of objects in said distributed domain in said object oriented environment;

computer readable means for providing a finder object for retrieving type specific factories capable of creating said plurality of objects within a particular scope in said distributed domain in said object oriented environment; and computer readable means for defining a scope for said factory object by the particular scope of said finder object by containing said finder object in said factory object such that an operation to create an object is executed for said factory object.

8. The computer program of claim 7, wherein the computer readable means for defining a scope of said factory object by the particular scope for said finder object comprises:

computer readable means for requesting type specific factories by said factory object from said finder object; and computer readable means for searching for type specific factories capable of creating said plurality of objects in said distributed domain using said type specific finder.

9. The computer program of claim 7, wherein the computer readable means for defining a scope of said factory object by the particular scope of said finder object comprises:

computer readable means for receiving a request from a client object by said factory object to create an object in said distributed domain; and computer readable means for means for receiving a Key on said request defining type of object to be created;

computer readable means for passing said Key by said factory object to said finder object having said particular scope; and computer readable means for returning type specific factory by said finder object capable of creating the object of said type defined by said Key within said particular scope.

* * * * *